April 25, 1944.    M. W. HUBER    2,347,321
PRESSURE CONTROL VALVE
Filed Nov. 12, 1942
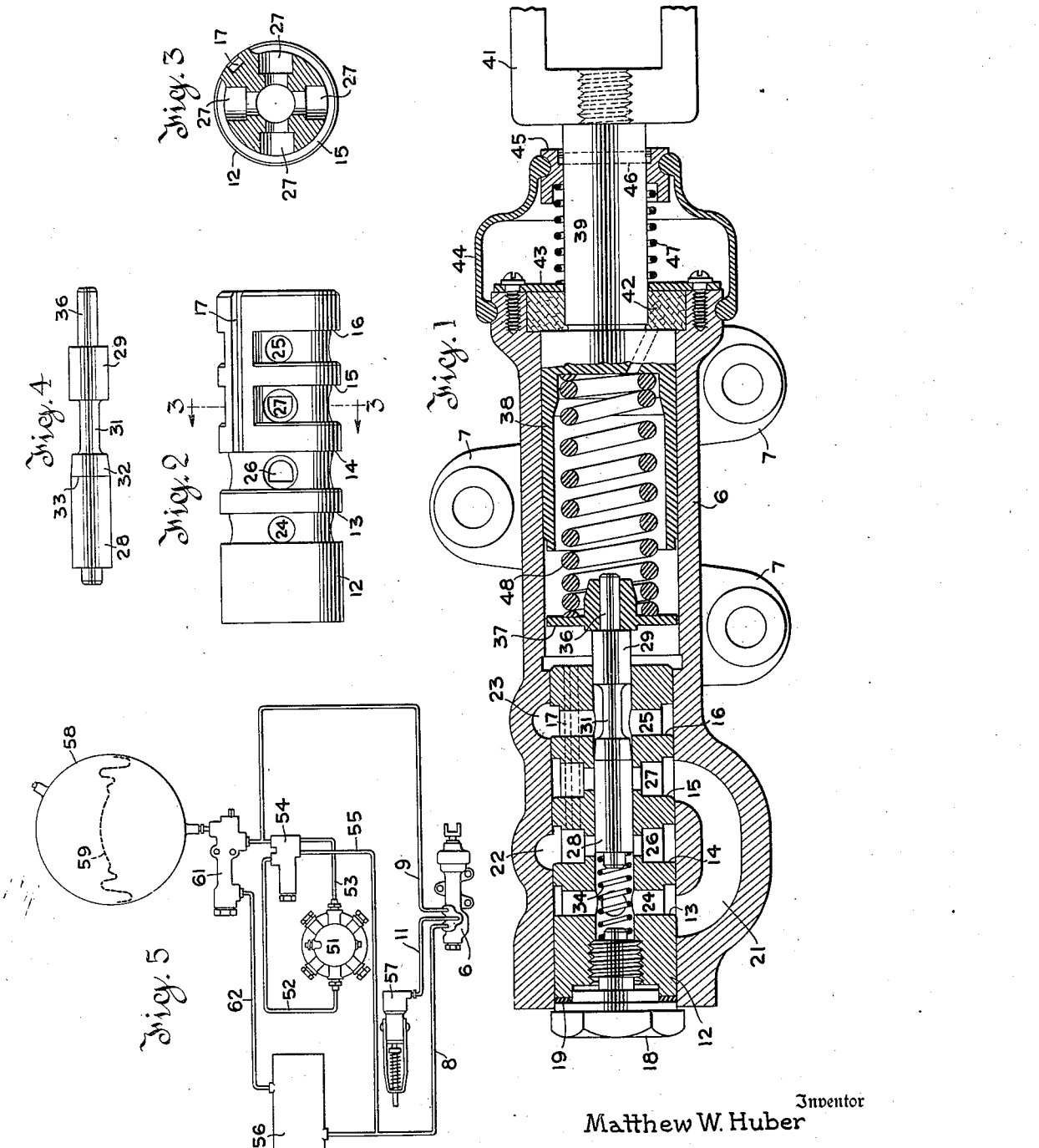
Inventor
Matthew W. Huber
By Dodge
Attorneys Patented Apr. 25, 1944

2,347,321

UNITED STATES PATENT OFFICE 2,347,321

PRESSURE CONTROL VALVE

Matthew W. Huber, Chicago, Ill., assignor, by mesne assignments, to The New York Air Brake Company, a corporation of New Jersey Application November 12, 1942, Serial No. 465,363

7 Claims. (Cl. 303—54)

This invention relates to manually actuated valves for controlling hydraulic pressure, and particularly to valves of the pressure weighing type, i. e., valves in which the regulated pressure is proportional to, or at any rate a function of the force manually applied to the valve.

This general principle of control has been successfully used with compressible fluids, for example, compressed air, at pressures of the order of two or three hundred pounds per square inch. The controlled pressure urges the valve in a lapping direction against the thrust of a manually stressed spring.

Successful application of this concept to incompressible liquids, and particularly where high supply pressures such as two thousand to three thousand pounds per square inch are used, involves wholly different problems, which render smooth operation much more difficult to attain.

In operating motor cylinders, for example, brake cylinders, there is nearly always some idle travel, so there is a substantial volume which must be filled rather quickly against rather low resistance. At the end of such filling there is a very sudden transition to high pressure conditions.

If the controlling valve is arranged to open rather wide, the valve will oscillate rapidly or chatter with very objectionable effects. When pressure starts to develop, it tends to rise too high, and then fluctuates widely.

Study of this problem has indicated that certain features are vital. The valve must be as nearly frictionless as possible and to get this result, use is made of a free lapped fit in a seat bushing that must be precisely straight. In practice the fit is so free that the valve will fall through the liner. To secure reasonable tightness with such a fit, the highest workmanship is necessary.

The loading spring must be accurately centered and impart no side thrust to the valve at any time. To this end it must be accurately wound and its ends must be ground precisely square.

Defining "scale" of a spring as the rate at which its force reaction builds up in relation to deformation, good regulation at high pressures demands high scale, while at low pressures a relatively low scale is needed, or the control will be harsh and erratic.

The present invention secures improved results by using two major factors in combination. The throttling characteristic of the valve is "softened" by so forming the inlet area of the valve that it has an exaggerated travel for a given change of throttle effect. This increases the "modulating range." The adjustable loading of the valve is effected by a spring so formed as to have a progressively varying scale. The resistance of the spring to compression rises more rapidly than the actual compression, and not in simple proportion thereto. Thus the scale is higher when the spring is heavily loaded than when it is lightly loaded.

A free acting valve of lengthened modulating range, used in combination with a truly centered spring of rising scale, ensures not only good modulation at one particular controlled pressure, but good modulation over a wide range of controlled pressures. Thus the valve will establish smoothly and precisely controlled pressures in a range much lower than could be maintained with prior art devices, and will retain its good operative characteristics continuously until the control pressure reaches the full pressure of supply.

A successful embodiment of the invention will now be described by reference to the accompanying drawing, in which—

Fig. 1 is a longitudinal axial section of the valve.

Fig. 2 is an elevation of the valve seat bushing.

Fig. 3 is a section on the line 3—3 of Fig. 2.

Fig. 4 is a detailed elevation of the piston valve.

Fig. 5 is a diagram of a typical hydraulic system including the improved valve.

The housing of the valve is indicated at 6 and is provided with the usual mounting lugs 7. As indicated in Fig. 5, it has provision for three connections, the low pressure or sump connection 8, the high pressure connection 9, and a connection 11 leading to the motor cylinder or other device in which a controlled pressure is to be established.

Pressed into the body 6 is a bushing 12 shown in section in Fig. 1, and in elevation in Fig. 2. This bushing has an axially extending bore to receive a balanced piston valve which will hereinafter be described in detail. The bushing is grooved circumferentially as indicated at 13 and 14, and is further provided with two partial circumferential grooves 15 and 16. The interruption in the grooves 15 and 16 is to afford space for a longitudinal pressure equalizing groove 17 which communicates at one end with the groove 14 and at the other end with the space beyond the bushing, that is, the space at the right hand end as viewed in the drawing.

The left hand end of the bore in the bushing is closed by a shouldered and threaded plug 18, which is screwed into threads formed in the end of the axial bore of the bushing and seals both with the bushing and the housing 6 by means of a confined compressible gasket 19.

The grooves 13 and 15 are connected together by a passage 21 formed in the housing 6, and this passage is in direct communication with the connection 11 which is the controlled pressure connection. The groove 14 communicates with a passage 22 formed in the housing and connected directly with the low pressure or sump connection 8. The groove 16 is in communication with the passage 23 in the housing, and this is in direct communication with the high pressure supply line 9. Since the longitudinal groove 17 is in communication with the low pressure passage 22, the space to the right of the bushing 12 is maintained at low or sump pressure.

Leading from the groove 13 are four radial ports 24, and leading from the groove 16 are four radial ports 25. Since neither of these sets of radial ports is controlled by the piston valve (both sets of ports being open at all times), simple drilled ports are provided. There are also four sets of radial ports 26 leading from the groove 14, and four sets of radial ports 27 leading from the groove 15. These ports have straight controlling edges to coact with the piston valve. As a convenient way of forming such ports, counterbores are used and the controlling portions of the port are broached so that the ports are of the D-shaped configuration clearly indicated in Fig. 2. It will be observed that the straight control edges of the ports 26 and 27 are on the sides of the ports remote from each other.

Mounted in the bore of the bushing 12 is a piston valve comprising two end head portions 28 and 29 with a reduced middle portion 31. The head 28 is the controlling portion of the valve, and the head 29 balances the effect of supply pressure. Beyond the control edge of the valve which coacts with the port 27, the head 28 has a very slightly tapered extension 32. Thus the control edge of the valve is the line 33 which marks the commencement of the taper. It will be observed that the head 28 between its left hand end and the line 33 has a slight positive lap on the ports 26 and 27, so that the head 28 may close both ports at the same time but will open one or the other upon slightly movement in either direction from the position in which this occurs.

The valve is urged to the right by a light spring 34 which is interposed between the head 28 and the plug 18. The spring is centered by lugs on the end of the valve and the end of the plug 18, and its ends are ground square so that the spring does not touch the bushing but acts freely in compression between the plug and the valve.

The right hand end of the valve has an extending reduced portion 36 which centers and sustains in thrust relation with the head 29 of the valve, a combined spring seat and dash-pot piston 37 which is slightly smaller than the guideway in which it moves. That portion of the housing 6 to the right of the bushing 12 is formed as a cylindrical guideway in which is slidably mounted a cup-shaped plunger 38. This plunger is formed on the end of an actuating stem 39 which carries a yoke 41 or other suitable means through which the plunger may be moved. The main loading spring 48 is mounted between and centered by the parts 37 and 38. Its ends are ground accurately square, so that the spring stands free from end to end. This spring is accurately wound as a helix of progressively increasing pitch, so that from the very start of compression the coils start to set solid at one end. This action is progressive so that the effective length of the spring decreases and the scale markedly increases as the spring is compressed.

The right hand end of the guideway is closed, and outward movement of the plunger 38 is limited by an oil seal 42 which is sustained by a cap plate 43. The cap plate is connected with the body 6 by screws as shown.

A boot 44 of rubber-like plastic material connects the right hand end of the housing 6 with a collar 45. The boot is formed at its two ends with circumferential retaining beads which snap into grooves on the housing. The collar 45 is retained by pin 46, whose ends are received in a counterbore in the outer face of the collar 45. A light spring 47 holds the parts in assembled relation.

While the valve may be used to control the pressure in any device, provided there is available a source of pressure fluid and some sort of sump or connection to receive discharged liquid, there is illustrated in Fig. 5 a typical installation.

In this drawing a motor driven pump is indicated at 51 with suction line 52 and discharge line 53. The valve 54 is an unloader valve assumed to be of the type which, on undue rise of discharge pressure, closes the suction to the pump, and if further rise occurs, connects the pump discharge with the sump. This valve, therefore, requires a connection 55 with the sump, as is indicated at 56.

The motor cylinder in which pressure is controlled by the valve is indicated at 57 and is connected directly with the line 11. The high pressure line 9 is connected to receive pressure fluid from the pump 51 and from an accumulator 58. This is indicated as of the gas-pressure type, including a diaphragm 59 which isolates the gas from the hydraulic liquid.

The valve indicated at 61 is a protection valve which normally connects the line 9 with the accumulator 58 but closes the connection upon substantial depletion of liquid in the accumulator 58. It will be observed that the line 9 is connected to a connection between the unloader valve 54 and the protection valve 61. The protection valve 61 has a leakage drain connection 62 leading to the sump 56.

The circuit above mentioned is not herein claimed. It has the advantage that the system is protected against the development of excess pressure by the pump, and the accumulator is protected against a complete loss of charge.

The operation of the valve will now be explained. Since the pressure in the cylinder 57 is always communicated through the ports 24 to the outer or left hand end of the valve head 28, the valve is always biased to the right by this pressure plus the light and negligible loading afforded by the spring 34. In the position shown in Fig. 1, the spring 48 is not stressed and the left hand end of head 28 opens the exhaust port 26, venting the work cylinder 57 to the sump 56.

If the plunger 39 be forced inward, the first effect is to move the valve without appreciable compression of spring 48 until the left hand end of head 28 laps the exhaust port 26. Shortly thereafter the line 33 defining the commencement of the taper 32 starts to over-travel the control edge of the port 27. The effect is to permit a very restricted flow of pressure fluid to the work cylinder passage 21.

The taper 32 gives a gradual supply port opening which retards the build-up of pressure in the work cylinder. Further, as back pressure builds up, the spring 48 must be compressed or the valve will close. As stated, its compression is attended with a gradual increase of scale. The pressure which will be developed in the work cylinder 57 is proportional to the force exerted to move the plunger 30 inward. It will be apparent that the scale of the loading spring 48 will be relatively lower when the pressure developed in cylinder 57 is low, than it will be when this pressure is high. The variable scale of the spring in combination with the gradual throttling effect of the taper 32 affords a smooth metering action, and permits the attainment in a single valve device of smooth graduation at low pressures with a sufficiently sharp reaction at high pressures. This change in character is dependent on the use of the spring of variable scale.

A freely movable valve, with accurately alined spring loading, is comparatively free from chattering and hunting, and with a loading spring of graduated scale, will give good modulation in the low pressure ranges (say below 500 pounds per square inch) as well as in the high pressure ranges (up to 1500 or even 3000 pounds).

The dash pot action of disc 97 is effective in steadying the action of the device. The disc offers little resistance to small or gradual motion, but resists sudden movements and movements of considerable range. Hence it stabilizes the sensitive piston valve without materially impairing its sensitivity.

The novel features combined in the structure illustrated and above described in detail, may be embodied in valves which differ in detail. Therefore, the specific embodiment above set forth should be regarded as illustrative only.

What is claimed is:

1. A self-lapping hydraulic valve mechanism comprising in combination, a ported seat; a coacting slide valve having positive lap and controlling admission and exhaust flows through ports in the seat by motion in opposite directions from its lap position; means responsive to pressures established by admission flow past the valve, and serving to urge the valve in its exhaust direction; and manually operable loading means for urging said valve in its admission direction, said means including a spring member so arranged that its scale increases with increases of stress in the spring.

2. A self-lapping hydraulic valve of the piston type comprising in combination, a ported seat; a coacting piston valve having a positive lap and controlling admission and exhaust flows through ports in the seat by motion in opposite directions from its lap position, the admission control edge of the valve being adjoined by a long tapered area serving to restrict the rate of increase of admission flows in relation to valve motion in the admission direction; means responsive to pressures established by admission flow, and serving to urge the valve in its exhaust direction; and manually operable loading means for urging said valve in its admission direction and including a loading spring so arranged that its scale increases with increase of stress in the spring.

3. A self-lapping hydraulic valve of the piston type comprising in combination, a ported seat; a coacting piston valve having a positive lap and controlling admission and exhaust flows through ports in the seat by motion in opposite directions from its lap position, the admission control edge of the valve being adjoined by a long tapered area serving to restrict the rate of increase of admission flows in relation to valve motion in the admission direction; means responsive to pressures established by admission flow, and serving to urge the valve in its exhaust direction; and manually operable loading means for urging said valve in its admission direction and including a loading spring.

4. A self-lapping hydraulic valve of the piston type comprising in combination, a ported seat; a coacting piston valve having a positive lap and controlling admission and exhaust flows through ports in the seat by motion in opposite directions from its lap position, the admission control edge of the valve being adjoined by a long tapered area serving to restrict the rate of increase of admission flows in relation to valve motion in the admission direction; means responsive to pressures established by admission flow, and serving to urge the valve in its exhaust direction; manually operable loading means for urging said valve in its admission direction and including a loading spring so arranged that its scale increases with increase of stress in the spring; and means comprising an abutment movable in a body of liquid, said abutment serving to steady motion of the end of said spring adjacent the valve.

5. A self-lapping hydraulic valve of the piston type comprising in combination, a ported seat; a coacting piston valve having a positive lap and controlling admission and exhaust flows through ports in the seat by motion in opposite directions from its lap position, the admission control edge of the valve being adjoined by a long tapered area serving to restrict the rate of increase of admission flows in relation to valve motion in the admission direction; means responsive to pressures established by admission flow, and serving to urge the valve in its exhaust direction; manually operable loading means for urging said valve in its admission direction and including a loading spring; and means comprising an abutment movable in a body of liquid, said abutment serving to steady motion of the end of said spring adjacent the valve.

6. In a self-lapping hydraulic valve, the combination of a housing having a ported cylindrical valve seat and an alined guideway, said cylindrical valve seat having an inlet port, an exhaust port, and a motor port which also communicates with one end of the cylindrical valve seat; a balanced piston valve freely shiftable in said cylindrical valve seat to connect the motor port selectively with the inlet and exhaust ports, one end of said valve serving as a piston subject to pressure in the motor port communicated through the end of the cylindrical valve seat; and loading means acting in thrust against the other end of the valve and comprising a shiftable plunger head and a coil compression spring interposed between said plunger head and the valve and extending freely between the same, said spring being wound with a progressively increasing pitch such that upon partial stressing of the spring and progressively thereafter, the effective length of the spring is reduced and its scale accordingly increased.

7. In a self-lapping hydraulic valve, the combination of a housing having a ported cylindrical valve seat and an alined guideway, said cylindrical valve seat having an inlet port, an exhaust port, and a motor port which also communicates with one end of the cylindrical valve seat; a balanced piston valve freely shiftable in said cylindrical valve seat to connect the motor port selectively with the inlet and exhaust ports, said valve having a positive lap and being formed with a long taper beyond its inlet control edge whereby inlet flow is throttled and increases at a relatively small rate with respect to the displacement of the valve in an inlet opening direction, one end of said valve serving as a piston subject to pressure in the motor port communicated through the end of the cylindrical valve seat and biasing the piston valve in a direction to open the exhaust and close the inlet port; and loading means acting in thrust against the valve and comprising a shiftable plunger head and an accurately centered coil compression spring interposed between said plunger head and the valve and extending freely between the same, said spring being wound with a progressively increasing pitch such that upon partial stressing of the spring and progressively thereafter, the effective length of the spring is reduced and its scale accordingly increased.

MATTHEW W. HUBER.